(12) United States Patent
Balasaygun et al.

(10) Patent No.: US 8,718,611 B2
(45) Date of Patent: May 6, 2014

(54) METHOD FOR THE SELECTION OF AN ACTIVE SOFTWARE ENVIRONMENT OF A VIRTUALIZED TELECOMMUNICATIONS TERMINAL

(75) Inventors: Mehmet C. Balasaygun, Freehold, NJ (US); John Buford, Princeton, NJ (US); Venkatesh Krishnaswamy, Holmdel, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1099 days.

(21) Appl. No.: 12/570,952

(22) Filed: Sep. 30, 2009

(65) Prior Publication Data

US 2011/0075825 A1 Mar. 31, 2011

(51) Int. Cl.
*H04M 3/42* (2006.01)

(52) U.S. Cl.
USPC ............. 455/414.1; 455/418; 718/1; 718/104

(58) Field of Classification Search
CPC ................................ G06F 9/455; G06F 9/441
USPC ......... 709/204, 206; 379/90.01, 93.17; 718/1, 718/104; 455/414.1, 418
See application file for complete search history.

(56) References Cited

U.S. PATENT DOCUMENTS

| 7,439,937 | B2 | 10/2008 | Ben-Shachar et al. |
| 7,555,522 | B2* | 6/2009 | Klassen et al. ................. 709/206 |
| 8,302,094 | B2* | 10/2012 | Rogel et al. .......................... 718/1 |
| 2003/0074451 | A1 | 4/2003 | Parker et al. |
| 2004/0127251 | A1 | 7/2004 | Thakkar et al. |
| 2005/0138124 | A1* | 6/2005 | Klassen et al. ................. 709/206 |
| 2006/0252464 | A1 | 11/2006 | Vander Veen et al. |
| 2007/0088762 | A1 | 4/2007 | Harris et al. |
| 2007/0168953 | A1* | 7/2007 | Diez et al. ...................... 717/118 |
| 2007/0171921 | A1 | 7/2007 | Wookey et al. |
| 2007/0189520 | A1 | 8/2007 | Altberg et al. |
| 2008/0005239 | A1* | 1/2008 | Podl .............................. 709/204 |
| 2008/0318616 | A1 | 12/2008 | Chipalkatti et al. |
| 2009/0036111 | A1 | 2/2009 | Danford et al. |
| 2009/0059965 | A1 | 3/2009 | Lin et al. |
| 2009/0187854 | A1* | 7/2009 | Murtagh ........................ 715/804 |
| 2009/0249332 | A1 | 10/2009 | Hoehle et al. |
| 2010/0017482 | A1* | 1/2010 | Piccinini et al. ............... 709/206 |
| 2010/0074155 | A1 | 3/2010 | Park et al. |
| 2010/0131625 | A1 | 5/2010 | Dehaan et al. |
| 2010/0211769 | A1 | 8/2010 | Shankar et al. |
| 2010/0235523 | A1 | 9/2010 | Garcia et al. |
| 2010/0241483 | A1* | 9/2010 | Haynes et al. ..................... 705/9 |
| 2010/0330961 | A1 | 12/2010 | Rogel |
| 2011/0003585 | A1 | 1/2011 | Wang et al. |
| 2011/0098089 | A1 | 4/2011 | Irie et al. |
| 2011/0126216 | A1* | 5/2011 | Galicia et al. .................. 719/318 |
| 2011/0314467 | A1* | 12/2011 | Pearson ............................ 718/1 |

OTHER PUBLICATIONS

General Purpose Hardware Abstraction Layer for Multiple Virtual Machine in Mobile Devices, Lee, Sang-Main, Feb. 15-18, 2009, IEEE, ICACT 2009.

* cited by examiner

*Primary Examiner* — Fan Tsang
*Assistant Examiner* — Simon King

(57) ABSTRACT

A method is presented for the automatic selection of the active software environment of a telecommunications terminal. In accordance with one embodiment of the present invention, the active software environment of a telecommunications terminal is selected on the basis of a characteristic of an incoming invitation to participate in a telecommunications session. In accordance with another embodiment of the present invention, the content of files residing in storage used by a system software instance is processed. When an incoming call is received, the present invention selects an active software environment on the basis of whether the caller is identified in any of the processed files.

17 Claims, 11 Drawing Sheets

METHOD FOR THE SELECTION OF AN ACTIVE SOFTWARE ENVIRONMENT OF A VIRTUALIZED TELECOMMUNICATIONS TERMINAL

FIELD OF THE INVENTION

The present invention relates to telecommunications in general, and, more particularly, to operating system selection.

BACKGROUND OF THE INVENTION

Oftentimes the members of a family have their own personal cellular telephones, as well as a shared landline telephone receiver which they keep at home. For example, a wife can have her own Nokia™ cellular telephone and, similarly, a husband can have a Blackberry™ cellular telephone. Over time, the wife can become accustomed to the features provided by her telephone receiver. And the husband, too, can become used to the layout of the user interface on his Blackberry™.

Operating system virtualization makes it possible to run the operating systems of both the Nokia™ and Blackberry™ on the landline receiver at the same time. Virtualization is a technology which allows devices, such as telephone receivers, to execute multiple operating systems concurrently. Thus, when a telephone receiver uses operating system virtualization to execute both the Nokia™ and the Blackberry™ operating systems concurrently, it can provide users with both the Nokia™ and Blackberry™ user interfaces at the same time.

Moreover, a user can transfer the data content (e.g. operating system files, telephony application files, contacts list files, executable files, data files, etc.) of his or her cellular phone to a landline telephone receiver and execute the transferred software on the landline receiver. For example, the wife can copy the data content of her Nokia™ cellular telephone to the landline receiver. This will enable the wife to set the Nokia™ operating system as the active software environment on the landline receiver and enjoy the same telephony applications and user interfaces with which she interacts on her cellular telephone. When the landline receiver provides virtualization, the husband, too, can transfer the data content of his Blackberry™ to the landline receiver and enjoy the Blackberry™ user interface accordingly.

When the Nokia™ operating system is the active software environment running on the landline receiver, the Nokia™ user interface will be visible on the terminal's display. And, alternatively, when the Blackberry™ operating system is the active software environment, the Blackberry™ user interface will be visible on the terminal's display. Stated succinctly, when an operating system instance is set as the "active software environment" of a telecommunications terminal, the interfaces of the operating system instance and/or one or more of the applications that execute within the operating system instance's memory space are displayed on the display screen of the terminal. In other words, for the purposes of this specification, "active software environment" is defined as:

(i) a system software instance whose user interface is visible on the display screen of a terminal; or
(ii) a system software instance that is executing a software application whose interface is visible on the display screen of a terminal; or
(iii) any combination of i and ii.

SUMMARY OF THE INVENTION

As noted, the selection of the active software environment that is executing on a telecommunications terminal determines, among other things, what user interface is going to be exposed to the users of the terminal. The users always have the option to manually select the active operating system. However, when an incoming telephone call is received, it is inconvenient for the users to change the active software environment prior to answering the invitation. For this reason, it is desirable that the choice of the active software environment be made automatically beforehand, so that users can answer incoming telephone calls from within their preferred software environment.

The present invention provides a method for the automatic selection of the active software environment of a telecommunications terminal. In accordance with one embodiment of the present invention, the active software environment of a telecommunications terminal is selected on the basis of a characteristic of an incoming invitation to participate in a telecommunications session.

For the purposes of this specification, a "characteristic of an invitation" is defined as any item of information concerning the invitation, such as, for example, and without limitation, time at which the invitation is received, identity of the sender of the invitation, type of the telecommunications session for which the invitation is received, medium of the telecommunications session, etc.

Thus, in the context of the above example, one embodiment of the present invention operates to select the Nokia™ operating system when a friend of the wife calls. In this way, the wife can be exposed to the familiar interface of her Nokia™ cellular telephone when she answers the call. Alternatively, when the caller is a friend of the husband, the active software environment will be set to the Blackberry™ operating system.

In accordance with a second embodiment of the present invention, the content of files residing in storage used by a system software instance is processed. When an incoming call is received, the present invention selects an active software environment on the basis of whether the caller is identified in any of the processed files. For example, if the sender is identified in a contacts list that is associated with a Nokia™ telephony application, the Nokia™ operating system is set as the active software environment. Alternatively, if the sender is identified in a contacts list associated with a Blackberry™ telephony application, the Blackberry™ operating system instance is set as the active software environment of the telecommunications terminal.

In accordance with a third embodiment of the present invention, a telecommunications terminal receives a radio signal which identifies a user and indicates that a user is in the vicinity of the telecommunications terminal. For example, and without limitation, the terminal can receive a radio frequency ID (RFID) signal identifying a user. Because, radio frequency ID (RFID) tags have limited range, the receipt of the signal at the telecommunications terminal informs that the user is in the vicinity of the terminal. Based on this information, the third embodiment of the present invention sets an operating system instance as the active software environment of the telecommunications terminal.

The following disclosure teaches examples of some embodiments and their operation.

DETAILED DESCRIPTION

Figure 1:
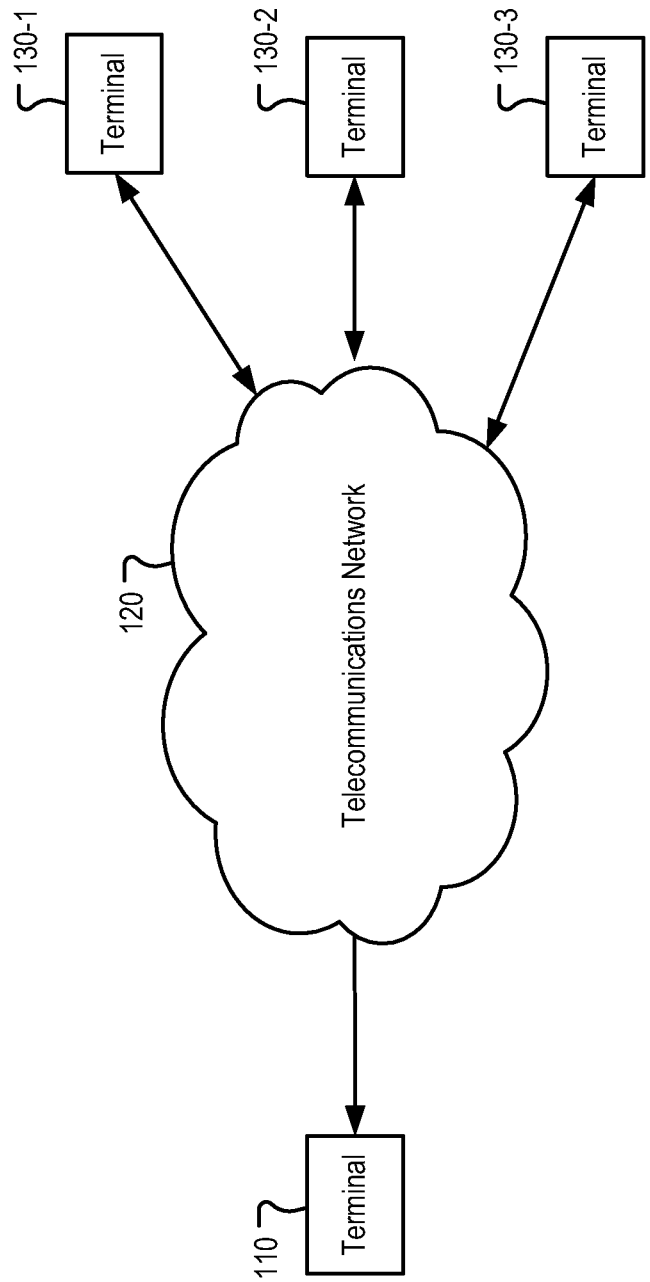
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises terminal 110, telecommunications network 120, and terminal 130-*i* wherein, i ∈{1, 2, 3}.

Terminal 110 is a desk set telephone receiver capable of running two or more operating systems in a virtualized fashion. In accordance with the illustrative embodiment of the present invention, terminal 110 is capable of both voice and video telecommunications, but it will be clear to those skilled in the art, after reading this disclosure, how to make and use alternative embodiments of the present invention in which terminal 110 has only a voice capability. Furthermore, it will be clear to those skilled in the art, after reading this disclosure, how to make and use alternative embodiments of the present invention in which terminal 110 is another type of telecommunications device (e.g. cellular telephone, 2-way radio, portable digital assistant, etc.).

Telecommunications network 120 transports signals between terminal 110 and terminals 130-*i*. In accordance with the illustrative embodiment of the present invention, telecommunications network 120 is the Internet, but it will be clear to those skilled in the art, after reading this disclosure, how to make and use alternative embodiments of the present invention in which telecommunications network 120 is any type of telecommunications network (e.g. local area network, the Public Switched Telephone Network, SONET, ATM, cellular network, etc.).

Terminal 130-*i* is a telephone receiver capable of conducting telecommunications sessions with terminal 110. It will be clear to those skilled in the art, after reading this disclosure, how to make and use alternative embodiments of the present invention in which terminal 110 is another type of telecommunications device (e.g. cellular telephone, 2-way radio, portable digital assistant, soft phone, desktop computer, etc.).

Figure 2:
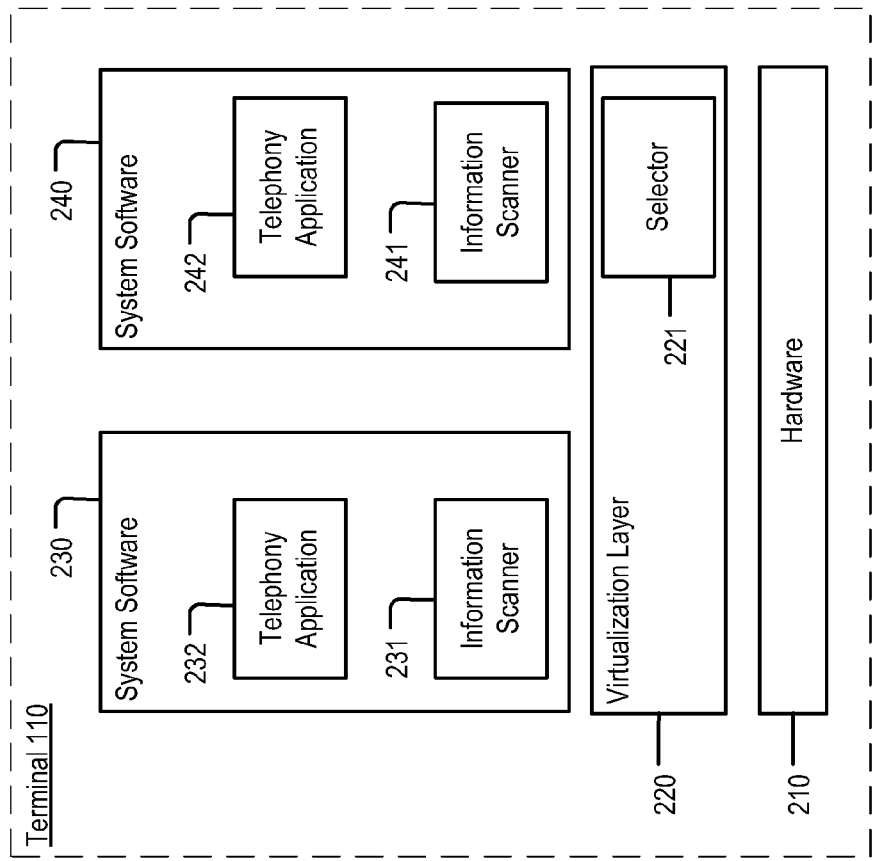
FIG. 2 depicts a schematic diagram of the salient components of the illustrative embodiment of the present invention.

FIG. 2 depicts a schematic diagram of the salient components of the illustrative embodiment of the present invention. The illustrative embodiment comprises system software 230, system software 240, virtualization layer 220, hardware 210, telephony application 232, telephony application 242, selector 221, scanner 231, and scanner 241.

Hardware 210 is the electronic components that comprise terminal 110, such as, for example, and without limitation, processor (single-core or multi-core), memory, transceiver, network interface, display, sound interface, video interface, etc. Hardware 210 is capable of executing system software and one or more telephony applications. It will be clear to those skilled in the art how to make and use hardware 210.

Virtualization layer 220 is a software layer that facilitates the sharing of the resources of hardware 210 by multiple system software images. In accordance with the illustrative embodiment of the present invention, virtualization layer 220 is an OKL4 micro kernel, but it will be clear to those skilled in the art, after reading this disclosure, how to make and use alternative embodiments of the present invention in which virtualization layer 220 is any other Type 1 hypervisor (e.g. Xen™, VMware ESX Server™, etc.) or any other hosted virtual machine (e.g. QEMU™, VMware Workstation™, etc.).

Selector 221 is a software module for selecting the active system software environment of terminal 110. In accordance with the illustrative embodiment of the present invention, selector 221 is executing inside virtualization layer 220, but it will be clear to those skilled in the art, after reading this disclosure, how to make and use alternative embodiments of the present invention in which selector 220 is executing at another location, such as, for example, and without limitation, inside system software 230, system software 240, another server, etc. The functions performed by selector 220 are described in further detail in the discussion with respect to FIGS. 4-12.

System Software 230 is an instance of an operating system. In accordance with the illustrative embodiment of the present invention, system software 230 is an image of the Android™ operating system that is running on top of virtualization layer 220. It will be clear to those skilled in the art, after reading this disclosure, how to make and use alternative embodiments of the present invention in which System Software 230 is any type of system software, firmware, or software platform that is capable of executing one or more software applications, such as, for example, and without limitation, Nokia Series 40 Platform ™, Nokia Series 60 Platform™, Embedded Linux, Symbian OS™, Linux, Blackberry OS™, etc. In accordance with the illustrative embodiment of the present invention, both telephony application 232 and scanner 231 are executing inside system software 230.

Telephony application 232 is a software application for conducting telephone conversations. It will be clear to those skilled in the art, after reading this disclosure, how to make and use alternative embodiments of the present invention in which telephony application 232 is any type of telecommunications application (e.g. instant messenger, video phone, audio enabled instant messenger, Skype™, Google Talk™, Yahoo Instant Messenger™, etc.).

Scanner 231 is a software module executing inside system software 230. Scanner 231 locates one or more contacts list files associated with telephony application 232 and extracts the contact information that is contained in the files. In accordance with the illustrative embodiment of the present invention, scanner 231 processes only contacts list files associated with telephony application 232. However, it will be clear to those skilled in the art, after reading this disclosure, how to make and use alternative embodiments of the present invention in which scanner 231 processes any other type of files, such as, for example, and without limitation, email client contacts lists, business card files, payroll sheets, class rosters, roll sheets, cookies from web sites, flash cookies, etc.

More specifically, scanner 231 locates the contacts list files, loads their content into memory, decodes the content, if necessary, and extracts the name and phone number of one or more people. After that, the scanner transmits the information to selector 221. It will be clear to those skilled in the art, after reading this disclosure, how to make and use alternative embodiments of the present invention in which scanner 231 extracts and forwards any item of information that is contained in the files, such as, for example, and without limitation, legal name, nick name, address, mobile telephone number, work telephone number, social networking web sites account information, etc.

System Software 240 is an instance of an operating system. In accordance with the illustrative embodiment of the present invention, system software 240 is an image of the Symbian™ operating system that is running on top of virtualization layer 220 concurrently with system software 230. It will be clear to those skilled in the art, after reading this disclosure, how to make and use alternative embodiments of the present invention in which system software 230 is any type of system software, firmware, or software platform that is capable of executing one or more software applications, such as, for example, and without limitation Nokia Series 40 Platform™, Nokia Series 60 Platform ™, Symbian OS™, Linux, Blackberry OS™, etc. In accordance with the illustrative embodiment of the present invention, both telephony application 242 and scanner 241 are executing inside system software 240.

Telephony application 242 is a software application for conducting telephone conversations. In accordance with the illustrative embodiment of the present invention, telephony application 242 is different software from telephony application 232, however it will be clear to those skilled in the art, after reading this disclosure, how to make and use alternative embodiments of the present invention, in which telephony applications 232 and 242 are different instances of the same software. It will be clear to those skilled in the art, after reading this disclosure, how to make and use alternative embodiments of the present invention in which telephony application 242 is any type of telecommunications application (e.g. instant messenger, video phone, audio enabled instant messenger, Skype™, Google Talk™, Yahoo Instant Messenger™, etc.).

Furthermore, in accordance with the illustrative embodiment of the present invention, telephony application 242 is configured to maintain a synchronized state with telephony application 232. Examples of methods for the synchronization of telephony applications residing on different system software images running on the same device are taught in application Ser. No. 12/563,289 and application Ser. No. 12/564,168 which are herein incorporated by reference. However, it will be clear to those skilled in the art, after reading this disclosure, how to make and use alternative embodiments of the present invention in which the telephony applications 232 and 242 are not configured to maintain a synchronized state.

Scanner 241 is a software module executing inside system software 240. Scanner 241 locates one or more contacts list files associated with telephony application 242 and extracts the contact information that is contained in the files. In accordance with the illustrative embodiment of the present invention, scanner 241 processes only contacts list files associated with telephony application 242. However, it will be clear to those skilled in the art, after reading this disclosure, how to make and use alternative embodiments of the present invention in which scanner 241 processes any other type of files, such as, for example, and without limitation, email client contacts lists, business card files, payroll sheets, class rosters, roll sheets, cookies from web sites, flash cookies, etc.

More specifically, scanner 241 locates the contacts list files, loads their content into memory, decodes the content, if necessary, and extracts the name and phone number of one or more people. After that, the scanner transmits the information to selector 221. It will be clear to those skilled in the art, after reading this disclosure, how to make and use alternative embodiments of the present invention in which scanner 241 extracts and forwards any item of information that is contained in the located files, such as, for example, and without limitation, a legal name, nick name, address, mobile telephones number, work telephone number, social networking web sites account information, etc.

Although scanners 231 and 241 are executing inside system software 230 and 240, respectively, it will be clear to those skilled in the art, after reading this disclosure, how to make and use alternative embodiments of the present invention in which scanners 231 and 241 execute inside the virtualization layer. Furthermore, it will be clear to those skilled in the art, after reading this disclosure, how to make and use alternative embodiments of the present invention in which a single software module fulfills the functions of both scanners.

Figure 3:
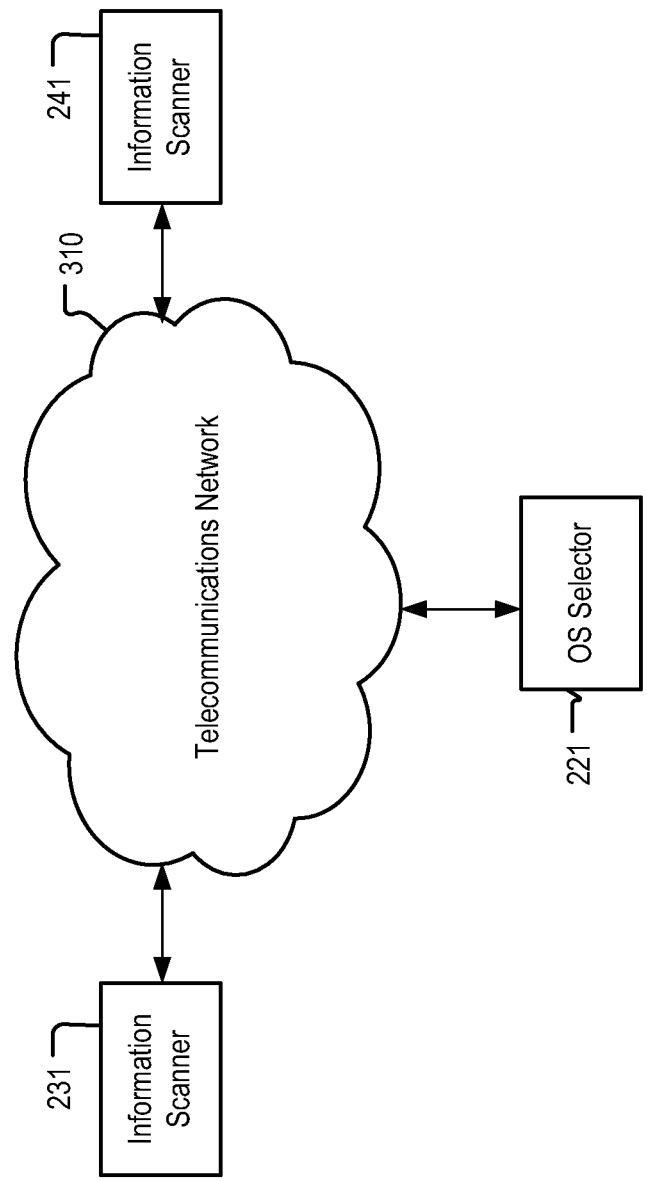
FIG. 3 depicts a schematic diagram of the salient components of the illustrative embodiment of the present invention.

FIG. 3 depicts a schematic diagram of the salient components of the illustrative embodiment of the present invention. The illustrative embodiment comprises information scanner 231, information scanner 241, and selector 221.

Telecommunications network 310 transports messages between scanner 231, scanner 241, and selector 221. In accordance with the illustrative embodiment of the present invention, telecommunications network 310 is the Internet, but it will be clear to those skilled in the art, after reading this disclosure, how to make and use alternative embodiments of the present invention in which telecommunications network 310 is any type of telecommunications network (e.g. local area network, the Public Switched Telephone Network, SONET, ATM, cellular network, etc.). Furthermore, in accordance with the illustrative embodiment of the present invention, telecommunications network 310 is the same entity as telecommunications network 120, but it will be clear to those skilled in the art, after reading this disclosure, how to make and use alternative embodiments of the present invention in which telecommunications network 310 and telecommunications network 120 are different entities.

Figure 4:
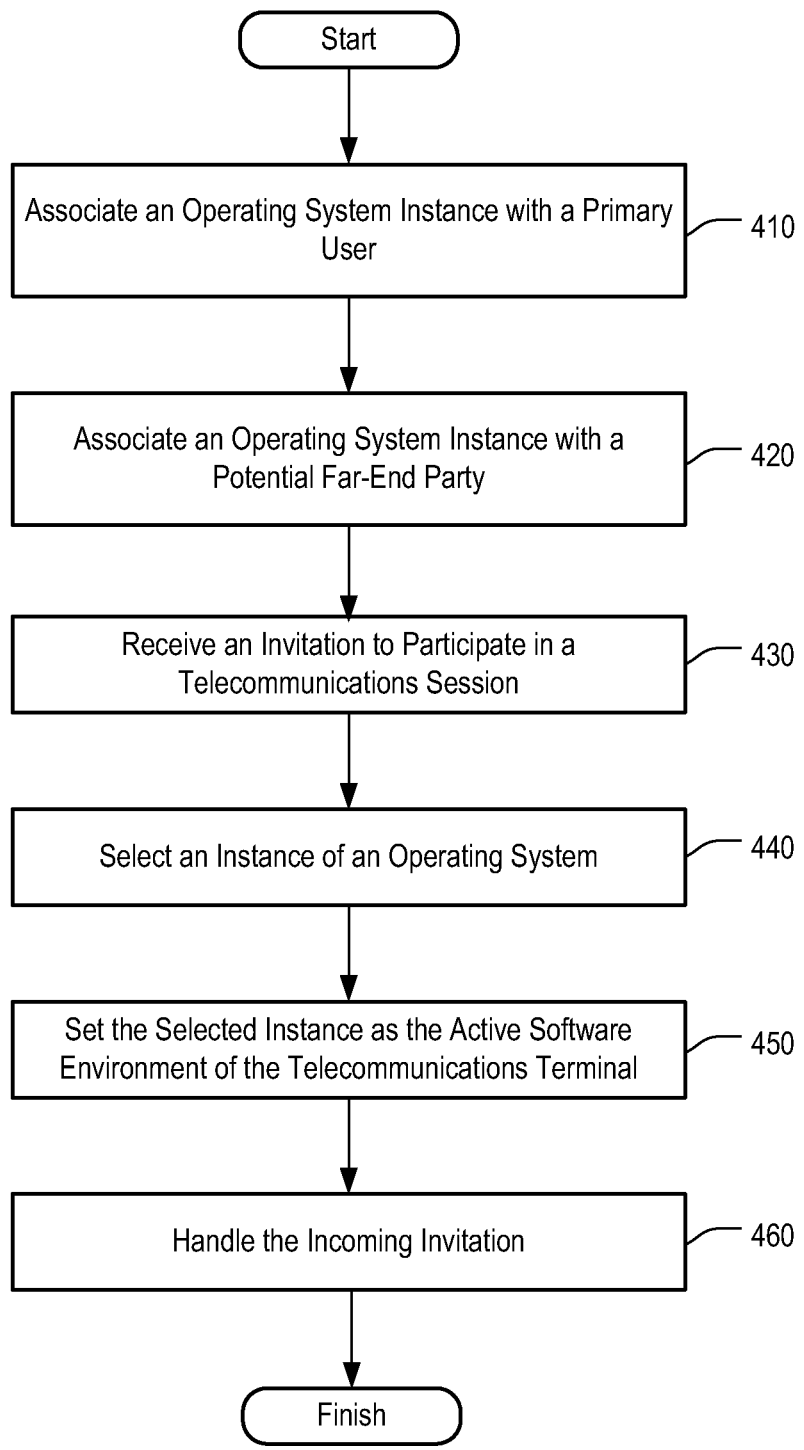
FIG. 4 depicts a flowchart of the execution of the salient tasks associated with the operation of the illustrative embodiment of the present invention.

FIG. 4 depicts a flowchart of the execution of the salient tasks associated with the operation of the illustrative embodiment of the present invention. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, selector 221 associates system software 230 with a primary user. A primary user is a person that prefers to use, or has a specific association with, a given system software. In the context of the example from the "Background" section of this disclosure, the primary user of the Nokia™ operating system is the wife. Although, at task 410 only system software 230 is associated with a primary user, it will be clear to those skilled in the art, after reading this disclosure, how to make and use alternative embodiments of the present invention in which selector 221 associates system software 240 with a primary user. Task 410 is further described in the discussion with respect to FIG. 5.

At task 420, selector 221 associates system software 230 with a potential far-end party. A potential far-end party is a person who may call terminal 110 in the future. Typically, but not always, a potential far-end party is someone listed in a contacts list file associated with telephony application 232

(which is executing in system software 230). Although, at task 420 only system software 230 is associated with a potential far-end party, it will be clear to those skilled in the art, after reading this disclosure, how to make and use alternative embodiments of the present invention in which selector 221 associates system software 240 with a potential far-end party. Task 420 is further described in the discussion with respect to FIG. 6.

At task 430, terminal 110, in a well known fashion, receives an invitation to participate in a telecommunications session. In accordance with the illustrative embodiment of the present invention, the invitation is a signal that there is an incoming telephone call (e.g. session initiation protocol (SIP) INVITE message). However, it will be clear to those skilled in the art, after reading this disclosure, how to make and use alternative embodiments of the present invention in which the invitation is a message that is not part of the signaling for a telecommunications session, such as, for example, and without limitation, an instant message, a short message service (SMS) message, etc. Furthermore, in accordance with the illustrative embodiment of the present invention, the telecommunications session, for which invitation is received, is a telephone call, but it will be clear to those skilled in the art, after reading this disclosure, how to make and use alternative embodiments of the present invention in which the invitation is for any type of telecommunications session (e.g. teleconference, video call, Internet chat, short message service (SMS) exchange, instant message exchange, etc).

At task 440, selector 221 selects the system software instance that is going to be the active software environment of terminal 110. In accordance with the illustrative embodiment of the present invention, selector 221 selects between system software 230 and system software 240, but it will be clear to those skilled in the art, after reading this disclosure, how to make and use alternative embodiments of the present invention in which any number of system software images is present in the selection pool (e.g. three four, eight, ten, etc.). Task 440 is described in further detail in the discussion with respect to FIG. 7.

At task 450, selector 221 sets the selected system software instance as the active software environment of terminal 110. In particular, selector 221 invokes one or more system calls provided by virtualization layer 220 in order to set the selected software environment as the active environment on terminal 110. Task 450 is further described in the discussion with respect to FIG. 9.

At task 460, the incoming invitation is handled. Task 460 is further described in the discussion with respect to FIG. 10.

Figure 5:
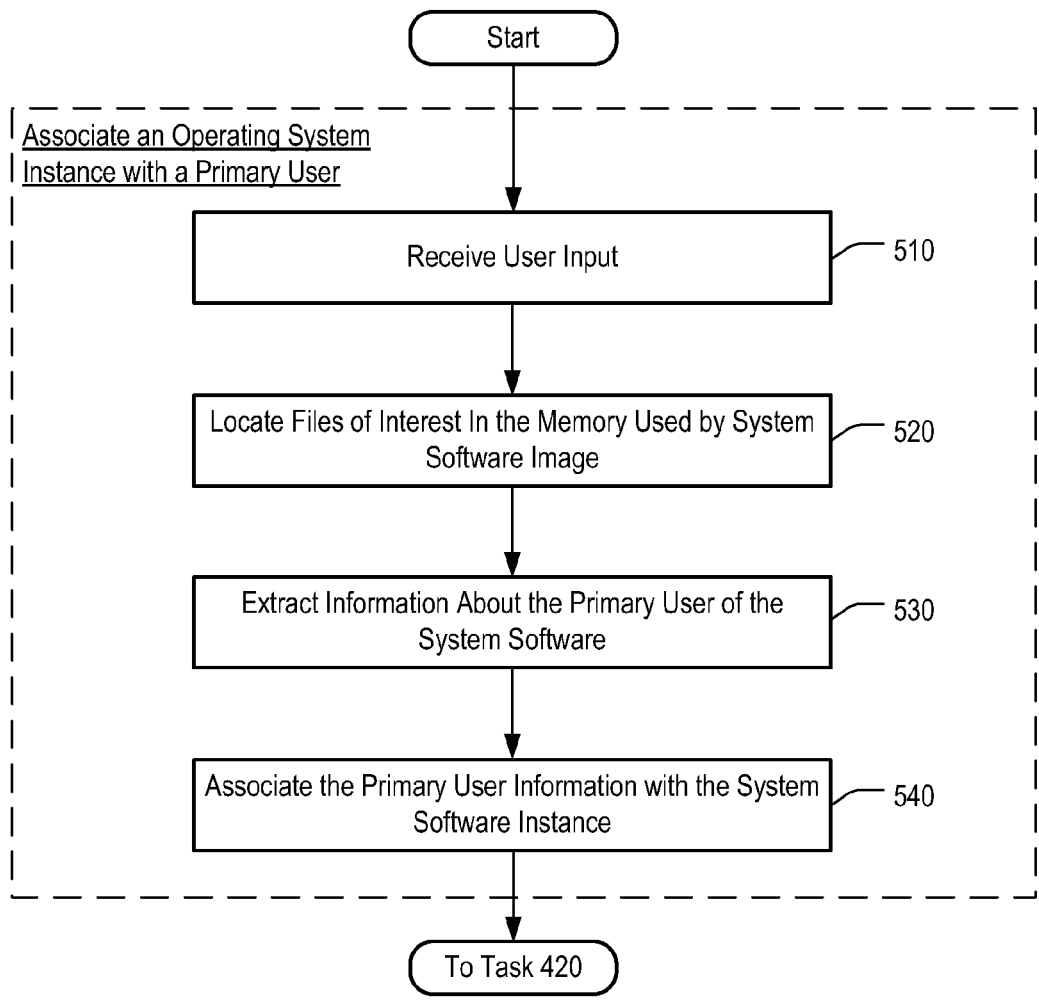
FIG. 5 depicts a flowchart of the execution of the salient subtasks associated with the performance of task 410.

FIG. 5 depicts a flowchart of the execution of the salient subtasks associated with the performance of task 410. It will be clear to those skilled in the art, after reading this disclosure, how to perform the tasks associated with FIG. 5 in a different order than represented or to perform one or more of the tasks concurrently. Furthermore, it will be clear to those skilled in the art, after reading this disclosure, how to make and use alternative embodiments of the present invention that omit one or more of the tasks.

At task 510, selector 221 receives information about the primary user of system software 230 through the input interface for terminal 110 (e.g. user types the information, etc.). In accordance with the illustrative embodiment of the present invention, the information input is the legal name of the primary user, but it will be clear to those skilled in the art, after reading this disclosure, how to make and use alternative embodiments of the present invention in which any type of information concerning the primary user is received (e.g. address, nick name, employment, social security, telephone number, instant messaging identifier, email address, radio frequency identifier (RFID), identifier broadcast by the Bluetooth module of the primary user's cellular telephone, etc.). Furthermore, it will be clear to those skilled in the art, after reading this disclosure, how to make and use alternative embodiments of the present invention in which the user input also identifies one or more of a storage device, storage device partition, and directory that are used by system software 230, etc.

At task 520, scanner 231 locates a file of interest on a storage device. Although, in accordance with the illustrative embodiment of the present invention, scanner 231 scans the whole storage device (e.g. solid state drive (SSD)), it will be clear to those skilled in the art, after reading this disclosure, how to make and use alternative embodiments of the present invention in which scanner 231 scans another storage unit, such as, for example, and without limitation, a specific partition or directory that is used by system software 230. In accordance with the illustrative embodiment of the present invention, scanner 231 seeks a file that identifies the person to whom the system software is registered. However, it will be clear to those skilled in the art, after reading this disclosure, how to make and use alternative embodiments of the present invention in which scanner 231 seeks another file, such as, for example, and without limitation, a business card file, file associated with telephony application 232, etc.

At task 530, scanner 231 processes the files located at task 620 and extracts information from them (e.g. name of a person, telephone number associated with telephony application 232, etc.). It also transmits the extracted information to selector 221. In accordance with the illustrative embodiment of the present invention, scanner 231 is programmed to extract sections of the files that contain relevant information (e.g. first thirty bytes of the file, information tagged with specific XML tags, etc.).

At task 540, selector 221 creates and stores an information record containing the information obtained at tasks 510 through 530. The information record relates system software 230 with the information about its primary user.

Figure 6:
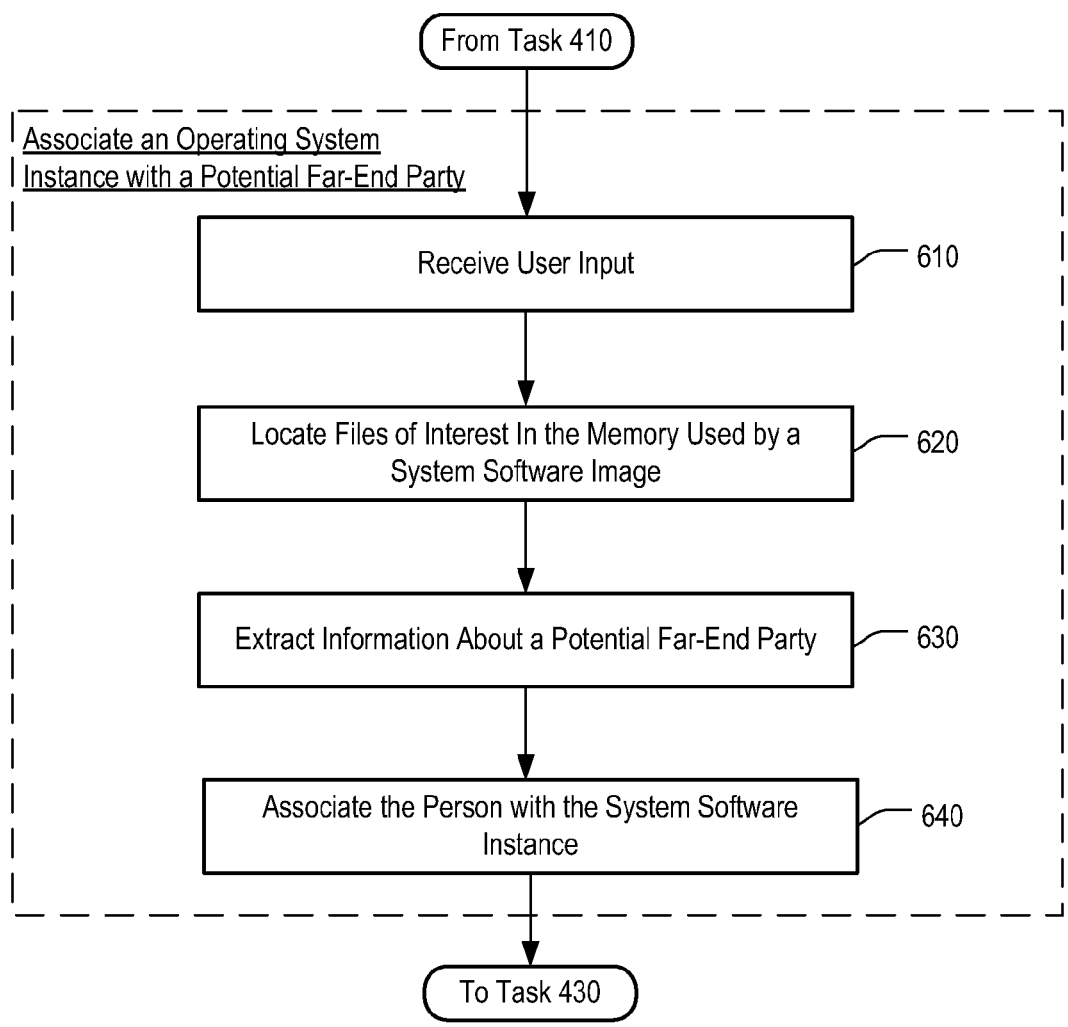
FIG. 6 depicts a flowchart of the execution of the salient subtasks associated with the performance of task 420.

FIG. 6 depicts a flowchart of the execution of the salient subtasks associated with the performance of task 420. It will be clear to those skilled in the art, after reading this disclosure, how to perform the tasks associated with FIG. 6 in a different order than represented or to perform one or more of the tasks concurrently. Furthermore, it will be clear to those skilled in the art, after reading this disclosure, how to make and use alternative embodiments of the present invention that omit one or more of the tasks.

At task 610, selector 221 receives information about a potential far-end party through the input interface for terminal 110 (e.g. user types the information, etc.). In accordance with the illustrative embodiment of the present invention, the input information is the far-end party's name and telephone number. However, it will be clear to those skilled in the art, after reading this disclosure, how to make and use alternative embodiments of the present invention in which other information is input, such as, for example, and without limitation, email address, address, etc.

At task 620, scanner 231 locates files of interest on a storage device used by system software 230. In accordance with the illustrative embodiment of the present invention, scanner 231 locates contacts list files that are associated with one or more telephony applications that are executing within the system software 230 (e.g. telephony application 232, etc.). However, it will be clear to those skilled in the art, after reading this disclosure, how to make and use alternative embodiments of the present invention in which scanner 231 locates different types of files, such as, for example, and without limitation, email contacts lists, instant messenger contacts lists, business card files, files whose extensions are associated with specific applications, etc. Although, in accordance with the illustrative embodiment of the present invention, an entire storage device is searched, it will be clear to those skilled in the art, after reading this disclosure, how to make and use alternative embodiments of the present invention in which another storage unit is searched, such as, for example, and without limitation, a storage device partition, specific folder on a storage device, etc. In accordance with the illustrative embodiment of the present invention, scanner 231 locates contacts list files that are associated with one or more telephony applications that are executing within the system software 230 (e.g. telephony application 232, etc.).

At task 630, scanner 231 processes the located files and extracts information from them. In accordance with the illustrative embodiment of the present invention, scanner 231 extracts a name and a telephone number of a person listed in a contacts list file. However, it will be clear to those skilled in the art, after reading this disclosure, how to make and use alternative embodiments of the present invention in which any type of information is extracted, such as, for example, and without limitation, email, address, employment information, instant messenger ID, work telephone number, etc. Also, in accordance with the illustrative embodiment of the present invention, scanner 231 is programmed to extract specific sections of the files that contain relevant information (e.g. first thirty bytes of the file, information tagged by specific XML tags, etc.) The extracted information is transmitted to selector 221.

At task 640, selector 221 creates and stores an information record containing the information obtained at tasks 610 through 630. The information record relates system software 230 with the information about the person whose information is extracted at task 630.

Figure 7A:
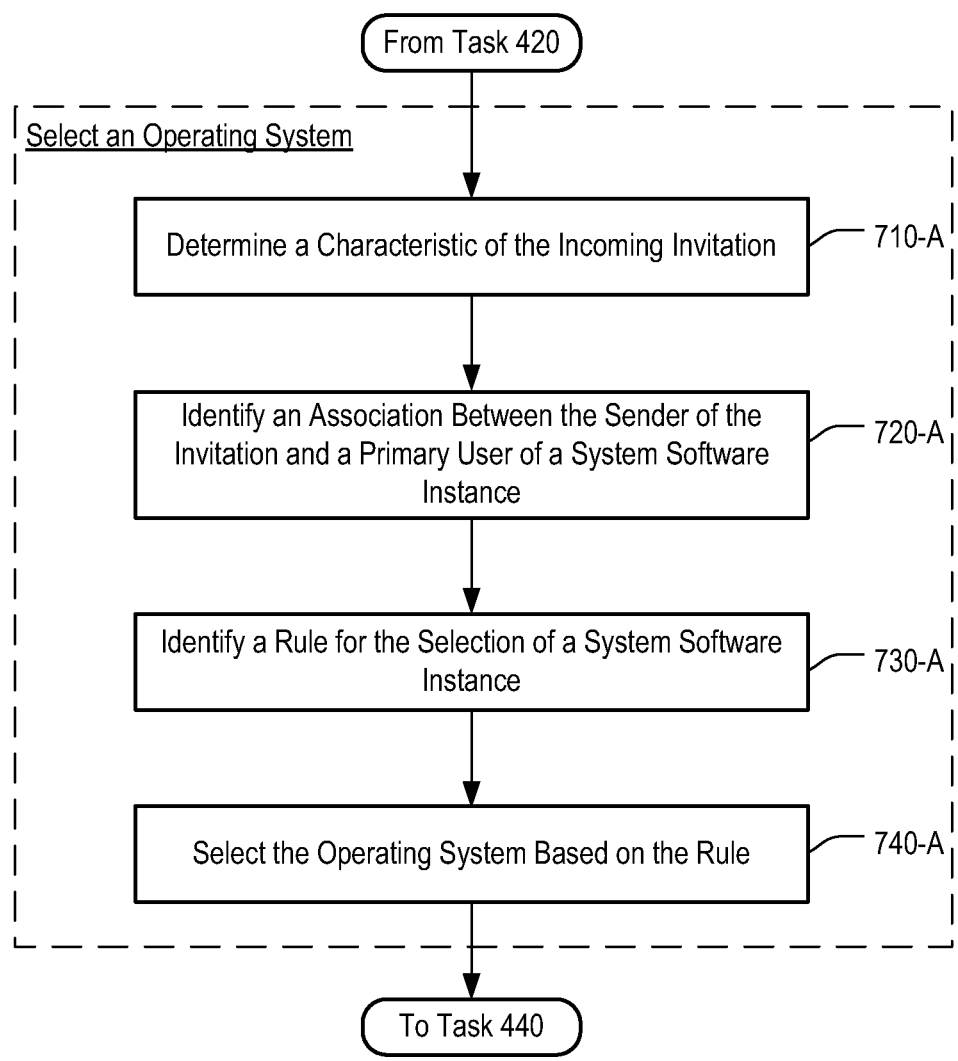
FIG. 7A depicts a flowchart of the execution of the salient subtasks associated with task 440 as performed by one illustrative embodiment of the present invention.

FIG. 7A depicts a flowchart of the execution of the salient subtasks associated with task 440 as performed by one illustrative embodiment of the present invention. It will be clear to those skilled in the art, after reading this disclosure, how to perform the tasks associated with FIG. 7A in a different order than represented or to perform one or more of the tasks concurrently. Furthermore, it will be clear to those skilled in the art, after reading this disclosure, how to make and use alternative embodiments of the present invention that omit one or more of the tasks.

At task 710-A, selector 221 determines a characteristic of the incoming invitation. Task 710-A is described in further detail in the discussion with respect to FIG. 8.

At task 720-A, selector 221 identifies an association between the sender of the invitation and the primary user of system software 230. In accordance with the illustrative embodiment of the present invention, selector 212 searches one or more social networking web pages, such as a MySpace™ web page, that belongs to the primary user of system software 230 and determines whether the sender of the invitation is listed as a friend of the primary user of system software 230. However, it will be clear to those skilled in the art, after reading this disclosure, how to make and use alternative embodiments of the present invention in which selector 221 searches additional records that refer to the names of both the sender of the invitation and the primary user of system software 230, such as, for example, and without limitation, employer web pages, school rosters, or any other document that can be found on the Internet.

At task 730-A, selector 221 identifies a rule for the selection of a system software instance as the active software environment of terminal 110. In accordance with the illustrative embodiment of the present invention, the identified rule is: "select system software 230 if the sender of the invitation is associated, as a potential far-end party, with system software 230 and select system software 240 if the sender of the invitation is associated, as a potential far-end party, with system software 240." More specifically, selector 221 uses the identifier for the sender of the invite message, which is determined at task 810, to search the record created at task 640 and determine whether the sender of the invitation is associated with system software 230 as a far-end party. It will be clear to those skilled in the art, after reading this disclosure, how to make and use alternative embodiments of the present invention in which selector 221 searches an information record in order to determine whether the sender of the invitation is associated with system software 240.

In accordance with the illustrative embodiment of the present invention, the rule for selection of active software environment of terminal 110 depends on whether the sender of the invitation is associated, as a potential-far-end party, with a system software instance. However, it will be clear to those skilled in the art, after reading this disclosure how to make and use alternative embodiments of the present invention in which the rule for selection depends on a characteristic of the invitation (e.g. time at which the invitation is received, type of the telecommunications session which the invitation is received for, media used for the telecommunications session, geographic location of the sender, etc.). Furthermore, it will be clear to those skilled in the art, after reading this disclosure, how to make and use alternative embodiments of the present invention in which the rule for selection of active software environment depends on an association between the sender of the invitation and the primary user of a system software instance.

And still furthermore, it will be clear to those skilled in the art, after reading this disclosure, how to make and use alternative embodiments of the present invention that employ the following specific rules for the selection of the active software environment of terminal 110:

i. select system software 230 if there is an association between the sender of the invitation and the primary user of system software 230 (e.g. they are Facebook™ friends, they are listed on a company website as employees of the company, etc.);
  ii. select system software 230 if the sender of the invitation is identified in a contacts list file associated with a telephony application executing inside the memory space of system software 230;
  iii. select system software 230 if the initiation is for a voice call and system software 240 if the invitation is for a text chat;
  iv. select system software 230 if the invitation is received before 9 a.m.

In accordance with the illustrative embodiment of the present invention, the rules for the selection of the active software environment of terminal 110 are set by the terminal's manufacturer, but it will be clear to those skilled in the art, after reading this disclosure, how to make and use alternative embodiments of the present invention in which the rules are customizable by terminal 110's users.

At task 740-A, selector 221 executes the rule for selection of an active software environment of terminal 110. In accordance with the illustrative embodiment of the present invention, selector 221 consults the information record created at task 640 to determine whether the sender of the invitation is associated, as a potential-far end party, with a system software instance. However it will be clear to those skilled in the art, after reading this disclosure, how to make and use alternative embodiments of the present invention in which selector 221 uses the information determined at tasks 710-A and 720-A to determine whether a condition for the selection of an active system software instance is met.

Figure 7B:
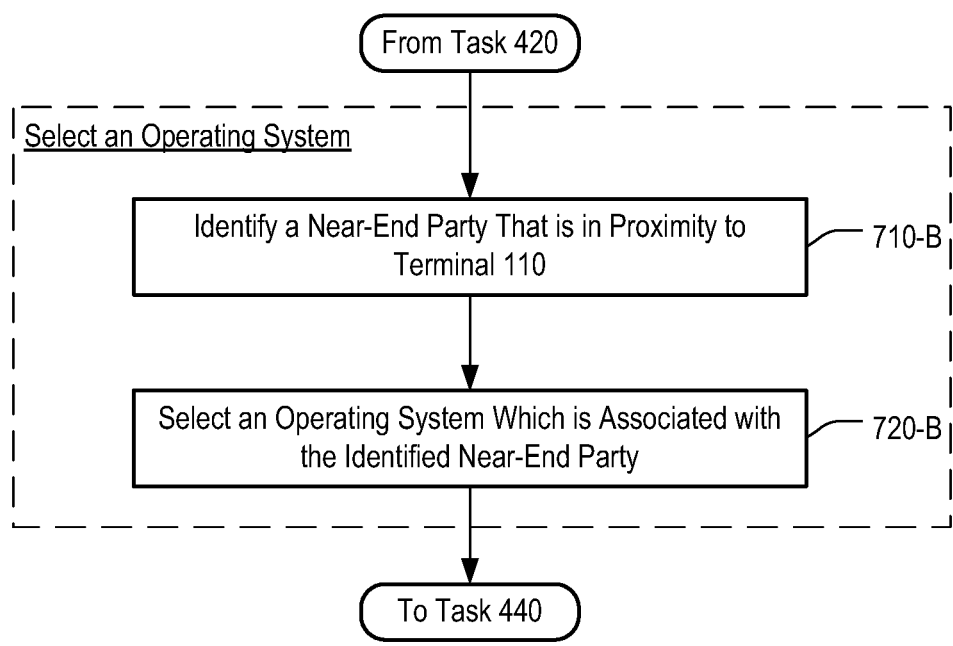
FIG. 7B depicts a flowchart of the execution of the salient subtasks associated with task 440 as performed by another illustrative embodiment of the present invention.

FIG. 7B depicts a flowchart of the execution of the salient subtasks associated with task 440 as performed by another illustrative embodiment of the present invention. It will be clear to those skilled in the art, after reading this disclosure, how to perform the tasks associated with FIG. 7B in a different order than represented or to perform one or more of the tasks concurrently. Furthermore, it will be clear to those skilled in the art, after reading this disclosure, how to make and use alternative embodiments of the present invention that omit one or more of the tasks.

At task 710-B, selector 221 identifies a user that is in proximity to terminal 110. In accordance with the illustrative embodiment of the present invention, selector 221 uses radio frequency ID (RFID) to identify a user that is standing in the vicinity of terminal 110. However, it will be clear to those skilled in the art, after reading this disclosure, how to make and use alternative embodiments of the present invention in which selector 221 uses an alternative technology to identify the user that is in proximity to terminal 110, such as, for example, and without limitation, Bluetooth (e.g. by detecting an identifier that is broadcast by the Bluetooth module of the cellular telephone of the user, etc.), location signal (e.g. Global Positioning System (GPS) signal), and others. And still furthermore, it will be clear to those skilled in the art, after reading this disclosure, how to make and use alternative embodiments of the present invention in which terminal 110 uses bio ID or another biometric technology to identify the user.

At task 720-B, selector 221 selects the active system software environment of terminal 110. In accordance with the illustrative embodiment of the present invention, selector 221 consults the information record created at task 540 to determine whether the identified user is associated with either of system software 230 and 240. Then, selector 221 selects the system software instance with which the identified user is associated.

Although tasks 710-B and 720-B are performed in response to the receipt of an invitation to participate in a telecommunications session, it will be clear to those skilled in the art, after reading this disclosure, how to make and use alternative embodiments of the present invention, in which the tasks are performed periodically without there being a specific stimulus necessary to trigger their execution. Furthermore, it will be clear to those skilled in the art, after reading this disclosure, how to make and use alternative embodiments of the present invention, in which the tasks are performed in response to an interaction between a user and terminal 110, such as, for example, and without limitation, picking up the handset in order to make a phone call, the pressing of a speakerphone button on the terminal, the dialing by the user of a number, the opening of an address book, etc.

Figure 8:
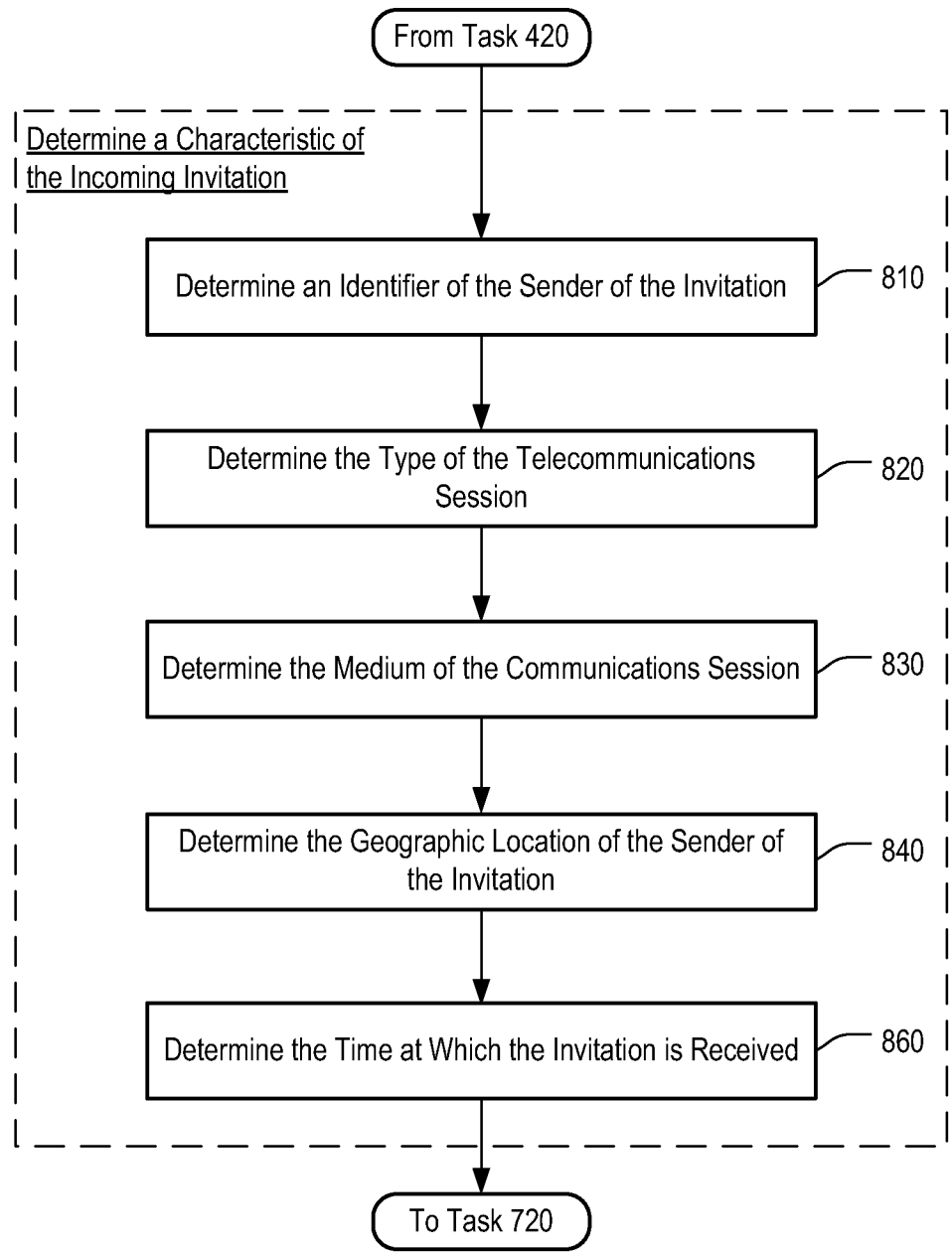
FIG. 8 depicts a flowchart of the execution of the salient subtasks associated with the performance of task 710-A.

FIG. 8 depicts a flowchart of the execution of the salient subtasks associated with the performance of task 710-A. It will be clear to those skilled in the art, after reading this disclosure, how to perform the tasks associated with FIG. 8 in a different order than represented or to perform one or more of the tasks concurrently. Furthermore, it will be clear to those skilled in the art, after reading this disclosure, how to make and use alternative embodiments of the present invention that omit one or more of the tasks.

At task 810, selector 221 determines an identifier for the sender of the invitation. In accordance with the illustrative embodiment of the present invention, the identifier is the address (e.g. telephone number) of the telecommunications terminal from which the invitation originated. Furthermore, in accordance with the illustrative embodiment of the present invention, the identifier is contained in the invitation. However, it will be clear to those skilled in the art, after reading this disclosure, how to make and use alternative embodiments of the present invention in which the identity is determined in alternative ways, such as, for example, and without limitation, caller ID, etc. Although, in accordance with the illustrative embodiment of the present invention, selector 221 determines a telephone number, it will be clear to those skilled in the art, after reading this disclosure, how to make and use alternative embodiments of the present invention in which another identifier contained in the invitation is used, such as, for example, and without limitation, Internet protocol (IP) address, instant messenger name, an alphanumerical string contained in the invitation, etc.

Furthermore, it will be clear to those skilled in the art, after reading this disclosure how to make and use alternative embodiments of the present invention in which selector 221 determines the legal name of the far-end party. In accordance with these embodiments, selector 210 performs a reverse telephone number search of the telephone number from which the invitation originated in order to determine the legal name of the sender of the invitation. However, it will be clear to those skilled in the art, after reading this disclosure, how to make and use alternative embodiments of the present invention in which selector 221 retrieves the identity of the sender from the information record created at task 640.

At task 820, selector 221 in a well known fashion determines the type of the telecommunications session (e.g. public switched telephone network (PSTN) telephone call, voice over Internet Protocol (VoIP) telephone call, video call, teleconference, short message service (SMS) exchange, Internet chat, etc.)

At task 830, selector 221 in a well known fashion determines the medium of the communications session (e.g. text, voice, video, etc.).

At task 840, selector 221 in a well known fashion determines the geographic location of the sender.

At task 850, selector 221 determines the time at which the invitation was received. In accordance with the illustrative embodiment of the present invention, selector 221 determines the time of the day, but it will be clear to those skilled in the art, after reading this disclosure, how to make and use alternative embodiments of the present invention in which selector 221 determines the day of the week, the date, the month, the year, etc.

Figure 9:
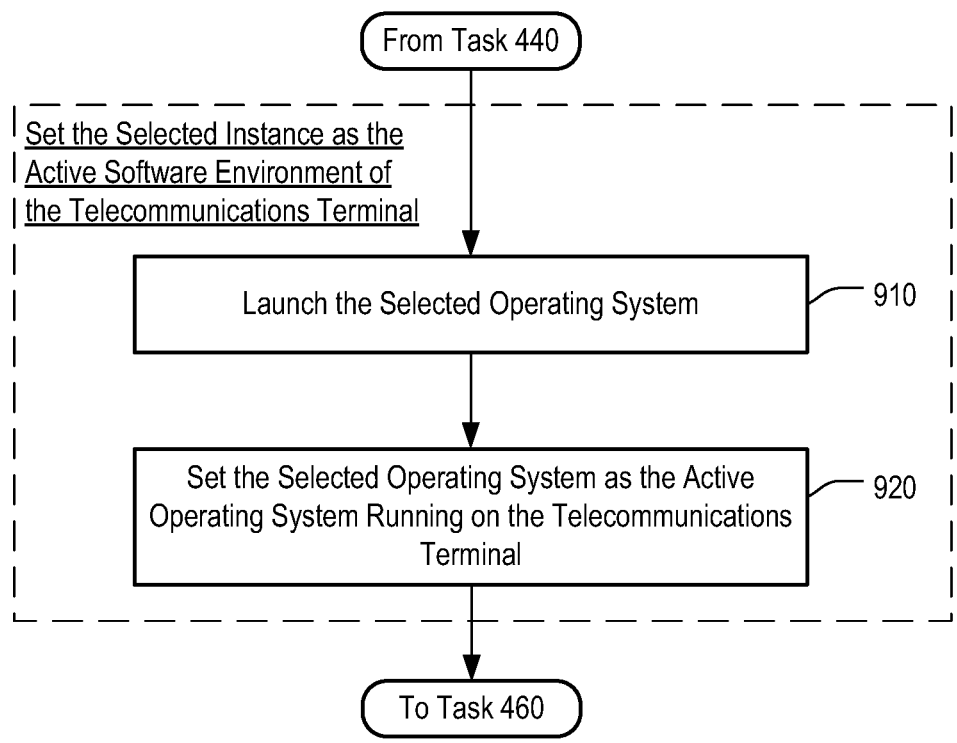
FIG. 9 depicts a flowchart of the execution of the salient subtasks associated with the performance of task 450.

FIG. 9 depicts a flowchart of the execution of the salient subtasks associated with the performance of task 450. It will be clear to those skilled in the art, after reading this disclosure, how to perform the tasks associated with FIG. 9 in a different order than represented or to perform one or more of the tasks concurrently. Furthermore, it will be clear to those skilled in the art, after reading this disclosure, how to make and use alternative embodiments of the present invention that omit one or more of the tasks.

At task 910, selector 221 invokes one or more system calls provided by virtualization layer 220 and causes it to launch the system software that is selected at task 740-A. Those skilled in the art will readily recognize that task 910 need not be executed in alternative embodiments of the present invention in which the system software instance, which is selected at task 740-A, is already started when the invitation is received.

At task 920, selector 221 invokes one or more system calls provided by virtualization layer 220 in order to set the launched system software instance in as the active software environment of terminal 110. When system software 230 is made the active software environment, the interfaces of the operating system instance and/or one or more of the applications that execute within the operating system instance's memory space are displayed on the display screen of the terminal.

Furthermore, those skilled in the art will recognize, after reading this disclosure, that in situations in which virtualization layer 220 runs on top of a native operating system, system software 230 will be an application executing in the native operating system instead of a separate software environment. Correspondingly, it will be clear to those skilled in the art, after reading this disclosure, how to make and use alternative embodiments of the present invention in which, at task 920, telecommunications terminal 110 makes system software 230 the active window that is open in the native operating system.

Figure 10:
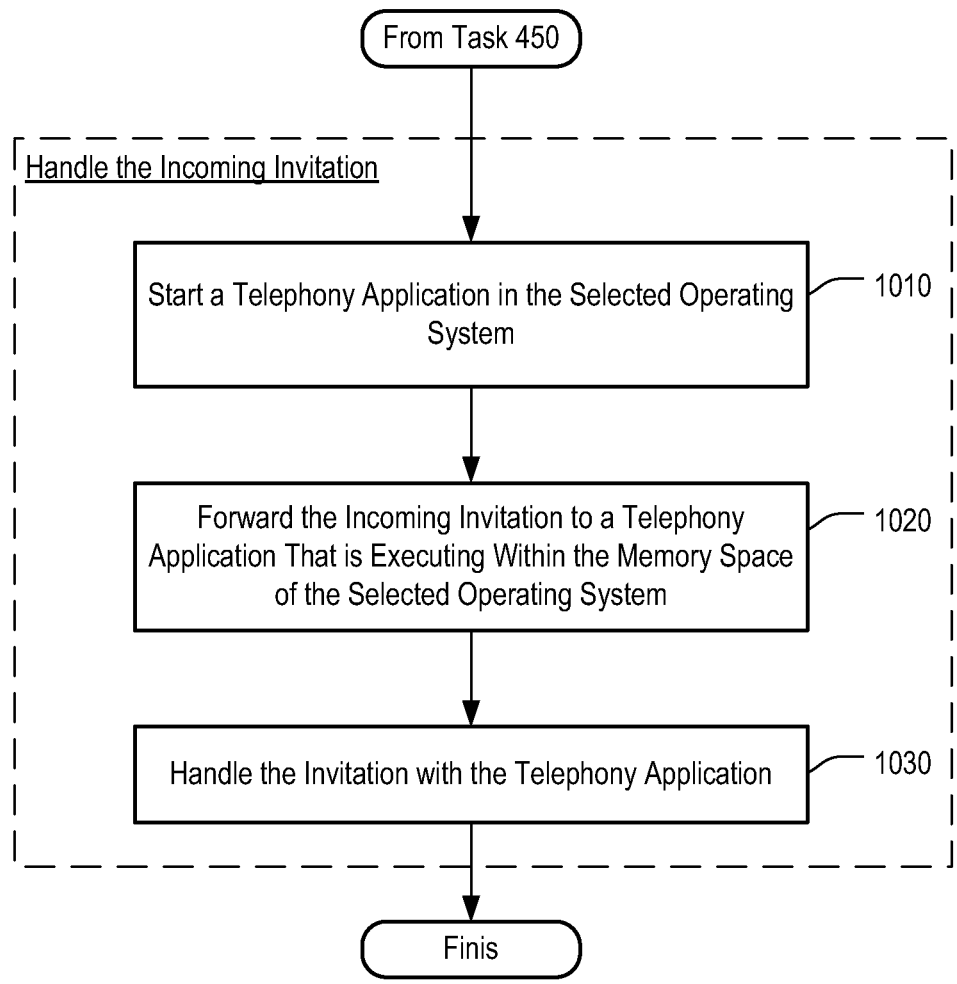
FIG. 10 depicts a flowchart of the execution of the salient subtasks associated with the performance of task 460.

FIG. 10 depicts a flowchart of the execution of the salient subtasks associated with the performance of task 450. It will be clear to those skilled in the art, after reading this disclosure, how to perform the tasks associated with FIG. 10 in a different order than represented or to perform one or more of the tasks concurrently. Furthermore, it will be clear to those skilled in the art, after reading this disclosure, how to make and use alternative embodiments of the present invention that omit one or more of the tasks.

At task 1010, terminal 110 starts a telecommunications application inside the active software environment of terminal 110. In accordance with the illustrative embodiment of the present invention, terminal 110 starts telephony application 232.

At task 1020, in a well known fashion, the invitation to participate in a telecommunications session is forwarded to the started application.

At task 1030, telephony application handles the received invitation. In accordance with the illustrative embodiment of the present invention, telephony application 232 displays an alert of the incoming call (e.g. plays a ringing signal), however it will be clear to those skilled in the art, after reading this disclosure, how to make and use alternative embodiments of the present invention in which telephony application takes another action, such as, for example, and without limitation, playing a message, etc.

It is to be understood that the disclosure teaches just examples of the illustrative embodiments and that many variations of the invention can easily be devised by those skilled in the art after reading this disclosure and that the scope of the present invention is to be determined by the following claims.

What is claimed is:

1. A method comprising:
   receiving, at a device, an invitation to participate in a communication session;
   selecting one of a first instance of operating system software and a second instance of operating system software, based on a characteristic detected by the device of the invitation, to yield a selected instance of operating system software; and
   loading, via a virtualization layer and in response to the invitation, the selected instance of operating system software as an active software environment for the device to participate in the communication session.

2. The method of claim 1, wherein the characteristic comprises an identity of a sender of the invitation.

3. The method of claim 1, wherein the characteristic comprises a medium of the communications session.

4. The method of claim 1, wherein the characteristic comprises a geographic location of a source of the invitation.

5. The method of claim 1, wherein the characteristic comprises a time at which the invitation is received.

6. The method of claim 1, wherein the characteristic comprises a day of a week on which the invitation is received.

7. The method of claim 1, wherein the characteristic comprises whether a sender of the invitation is identified in a contacts list stored in memory used by the first instance of operating system software.

8. The method of claim 1, wherein the characteristic comprises an identity of an intended recipient of the invitation.

9. The method of claim 1, wherein the first instance of operating system software and the second instance of operating system software are of different operating systems.

10. A system comprising:
    a processor; and
    a computer-readable storage medium storing instructions which, when executed by the processor, cause the processor to perform operations comprising:
       receiving an invitation to participate in a communications session;
       selecting one of a first instance of operating system software and a second instance of operating system software, based on a characteristic detected by a device of the invitation, to yield a selected instance of operating system software; and
       loading, via a virtualization layer and in response to the invitation, the selected instance of operating system software as an active software environment to participate in the communications session.

11. The system of claim 10, wherein the characteristic comprises a geographic location of a source of the invitation.

12. The system of claim 10, wherein the characteristic comprises a day of a week on which the invitation is received.

13. The system of claim 10, wherein the characteristic comprises an identity of an intended recipient of the invitation.

14. A computer-readable storage device storing instructions which, when executed by a processor, cause the processor to perform operations comprising:
    receiving an invitation to participate in a communications session;
    selecting one of a first instance of operating system software and a second instance of operating system software, based on a characteristic detected by a device of the invitation, to yield a selected instance of operating system software; and
    loading, via a virtualization layer and in response to the invitation, the selected instance of operating system software as an active software environment to participate in the communications session.

15. The computer-readable storage device of claim 14, wherein the characteristic comprises an identity of a sender of the invitation.

16. The computer-readable storage device of claim 14, wherein the characteristic comprises a geographic location of a source of the invitation.

17. The computer-readable storage device of claim 14, wherein the characteristic comprises a day of a week on which the invitation is received.

* * * * *